Nov. 21, 1967  A. FEROY  3,353,493
CONTINUOUSLY VARIABLE HYDRAULIC TRANSMISSIONS
Filed July 2, 1965  2 Sheets-Sheet 1
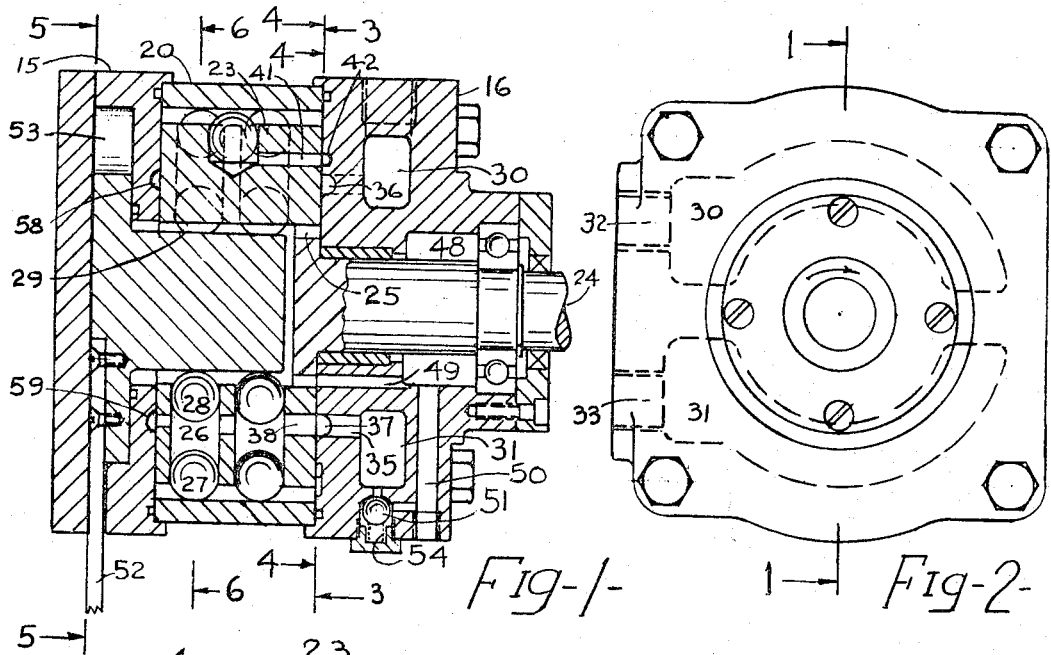
Fig-1-  Fig-2-
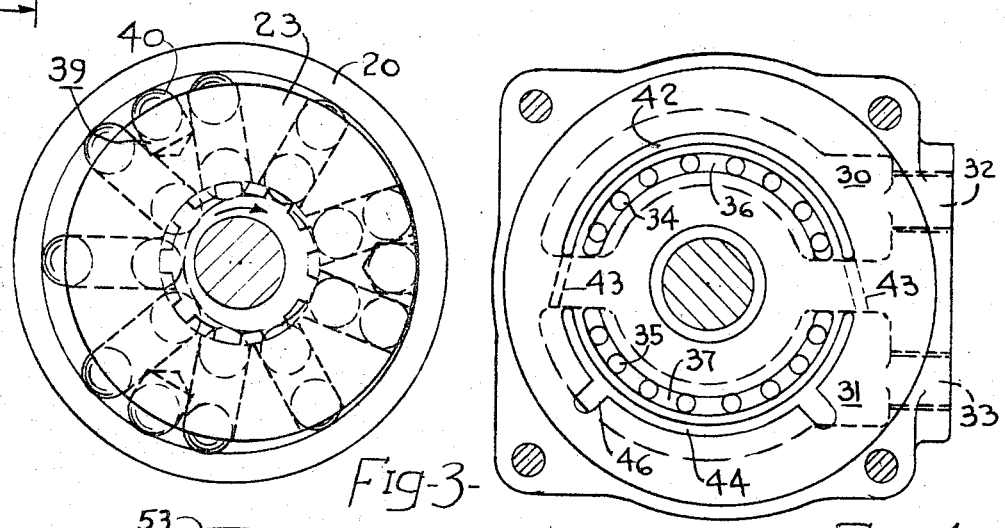
Fig-3-  Fig-4-
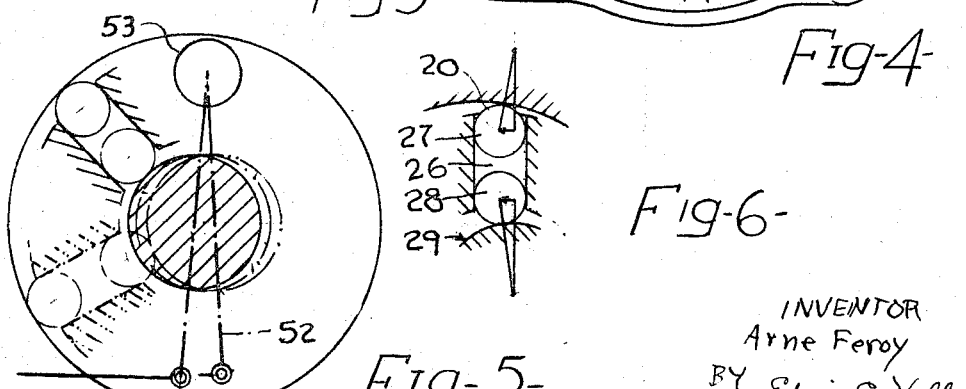
Fig-5-  Fig-6-
INVENTOR
Arne Feroy
BY Edwin S. Hall
ATTORNEY

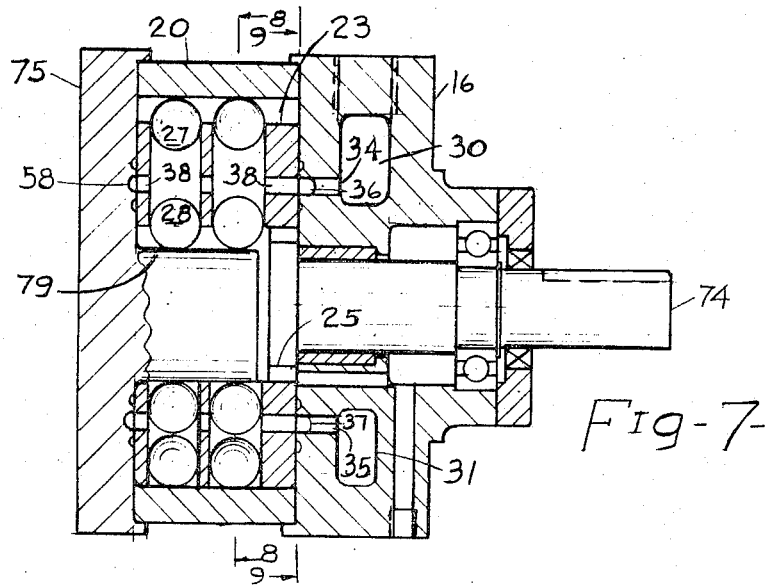
Fig-7-
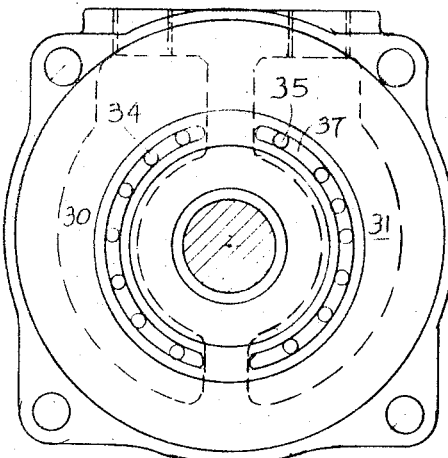
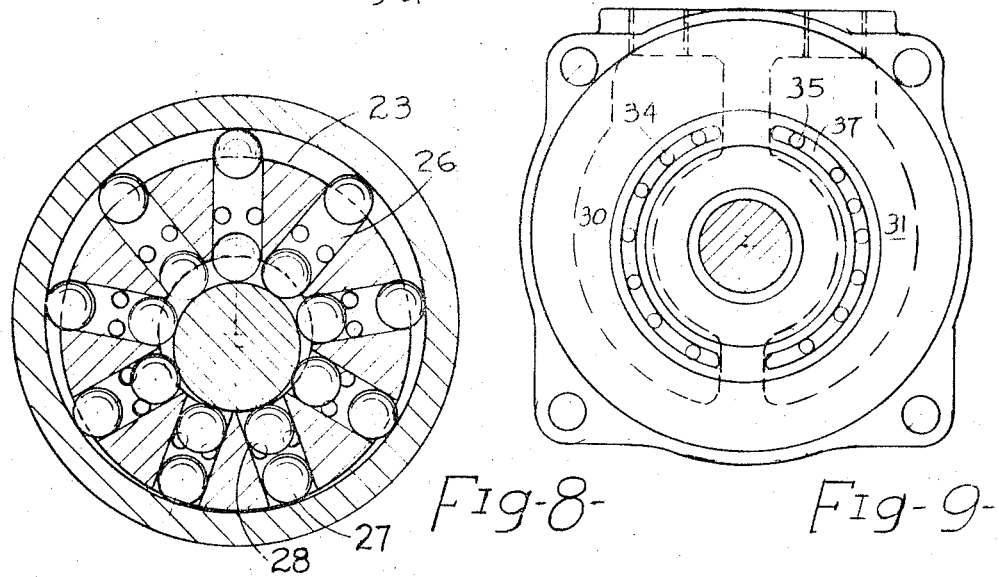
Fig-8-    Fig-9-
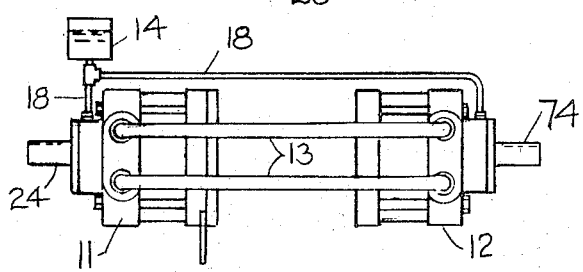
Fig-10-
INVENTOR.
Arne Feroy
BY Edwin S. Hall
ATTORNEY

United States Patent Office 3,353,493
Patented Nov. 21, 1967

3,353,493
CONTINUOUSLY VARIABLE HYDRAULIC
TRANSMISSIONS
Arne Feroy, 1921 S. 291st Place, Kent, Wash. 98002
Filed July 2, 1965, Ser. No. 469,216
2 Claims. (Cl. 103—161)

This invention relates to continuously variable hydraulic transmissions of the class having piston members reciprocating in pumping cylinders and delivering oil under pressure to similar piston members reciprocating in motor cylinders. Known transmissions of this class include those having cylinders parallel to the shaft, the piston members coacting with swash-plates, and those having cylinders radial to the shaft, the piston members coacting with eccentrics or cranks. This invention is illustrated and described in connection with the latter construction, but could be used with the former construction. With either, most known hydraulic transmissions have relatively expensive parts, ball-jointed connecting rods, for example, their manufacturing cost being prohibitive in many applications. One known radial cylinder mechanism uses ball pistons running on a surrounding (internal) eccentric, eliminating the need for connecting rods and reducing manufacturing cost. Obviously the maximum possible ball piston stroke is equal to half the diameter of the ball. An object of this invention is to double the effective ball piston stroke and the piston displacement by adding an inner set of ball pistons running on an inner (external) eccentric, two ball pistons in each cylinder. Another object is to provide an improved means for varying the effective ball piston stroke by adjusting the inner eccentric relative to the outer eccentric. Another object is to provide a continuously variable transmission structure in which friction losses are extremely low.

Another object of the invention is to provide for the direct flow of oil to the pumping chambers. Another object is to provide means for priming the pumping chambers with oil at suitable initial pressure, insuring that both sets of ball pistons remain in running contact with their respective eccentrics.

Another object is to provide a continuously variable hydraulic transmission simple enough to be manufactured to compete commercially with conventional gear reductions and transmissions.

These and other objects will be apparent from the following specification in connection with the drawings in which:

FIG. 1 is a longitudinal section of the pump mechanism taken on line 1—1 of FIG. 2;

FIG. 2 is an end view of the pump mechanism of FIG. 1;

FIG. 3 is a transverse section on the line 3—3 of FIG. 1;

FIG. 4 is a transverse section on the line 4—4 of FIG. 1;

FIG. 5 is a schematic view showing the range of adjustment of the inner eccentric relative to the outer eccentric, taken on line 5—5 of FIG. 1;

FIG. 6 is a schematic section of one of the cylindrical pumping chambers showing force components, taken on line 6—6 of FIG. 1;

FIG. 7 is an axial section of the mechanism used as a motor;

FIG. 8 is a transverse section taken on line 8—8 of FIG. 7;

FIG. 9 is a transverse section taken on line 9—9 of FIG. 7; and

FIG. 10 shows a hydraulic transmission comprising a pump unit connected to a motor unit.

Briefly described, the invention comprises a hydraulic transmission having a variable capacity pump unit connected to a constant or variable capacity motor unit, each unit having a rotor with radial cylinders, each cylinder operably containing two ball pistons driven independently by outer and inner eccentrics respectively, the eccentricity of one or both of the eccentrics being adjustable.

Referring to the drawings, FIG. 10 shows pump unit 11 connected to motor unit 12 by pipes 13. Reservoir 14 contains working fluid (oil) at atmospheric pressure; the oil may flow into pump unit 11 and motor unit 12 thru pipes 18.

The stationary parts (stator) of pump unit 11 (FIGS. 1–6) include end plates 15 and 16, and outer (internal) eccentric ring 20, and inner (external) eccentric 29 adjustably mounted in end plate 15. The stationary parts (stator) of the motor unit 12 (FIGS. 7–9) include end plates 75 and 16, outer (internal) eccentric ring 20, and inner (external) eccentric 79 integral with end plate 75.

Rotor 23 is operably connected to shaft 24 by splines 25. Rotor 23 is provided with radial cylinders 26 which form pumping chambers between outer balls 27 and inner balls 28. Outer balls 27 run on and coact with outer (internal) eccentric ring 20. Inner balls 28 run on and coact with inner (external) eccentric 29. FIG. 1 shows two axially spaced sets of identical cylinders 26; any number—one or more—may be used.

Stator end plate 15 contains two arcuate manifolds 30 and 31, one for incoming oil and the other for outgoing oil depending on the direction of rotation of shaft 24 and rotor 23. With clockwise rotation indicated in FIGS. 2 and 3, manifold 31 is the low pressure or inlet manifold and manifold 30 is the high pressure or outgoing manifold.

Manifolds 30 and 31 are provided with holes 34 and 35 respectively which connect with arcuate grooves 36 and 37 respectively formed in the inner face of stator end plate 16 (FIGS. 1 and 4). Rotor 23 is provided with axial holes 38 connecting arcuate grooves 36 and 37 to pumping chambers between outer balls 27 and inner balls 28 in cylinders 26, and to arcuate grooves 58 and 59 in stator end plate 15.

Centrifugal force will keep outer balls 27 in running contact with outer eccentric ring 20, but will tend to throw inner balls 28 out of running contact with inner eccentric 29. To keep ball pistons 28 in running contact with inner eccentric 29 and to keep the pumping cylinders always primed with working fluid (oil), rotor 23 is provided with additional radial cylinders 39 containing ball pistons 40 riding on and coacting with outer eccentric ring 20. Rotor 23 is also provided with holes 41 connecting with arcuate grooves 42 and 44 in stator end plate 16 (FIGS. 1 and 4). Holes 43 connect priming pressure arcuate groove 42 to the low pressure or inlet manifold 31 in stator end plate 16, and thru passage 50 to relief valve 51 controlled by spring 54. Low pressure arcuate groove 44 receives oil thru radial passages 46 (FIG. 4) from the clearance spaces inside and outside rotor 23 (connected by radial holes in rotor 23, not shown) and from passage 49 and chamber 48 which receive oil from tank 14 flowing thru pipe 18.

Eccentric 29 is pivotally mounted on pin 53 in stator end plate 15. Eccentric 29 may be shifted from a position coaxial with outer eccentric 20 (no pumping action between balls 27 and 28) to the position opposite to that of outer eccentric ring 20 (maximum pumping action, the combined strokes of balls 27 and 28 being substantially equal to the ball diameter). It is obvious to one skilled in the art that either outer eccentric 20 or inner eccentric 29, or both, may be shifted, the one relative to the other, to vary the ball piston strokes and the displacement of the unit.

Referring to FIGS. 7–9, the hydraulic motor unit is similar in construction to the pump unit of FIGS. 1–6, except that the ball piston stroke and displacement of the motor unit are ordinarily constant instead of variable, the positions of both eccentrics in the stator being fixed.

In operation, priming pump ball pistons 40, coacting with outer eccentric 20, take oil from tank 14, pipe 18, chamber 48, passage 49, clearance spaces inside and outside rotor 23, passages 46, arcuate manifold 44, and holes 41, and deliver oil under priming pressure (controlled by relief valve spring 54) to arcuate manifold groove 42, thru holes 43 to low pressure or inlet manifold 31 in stator end plate 16 of pump unit 11. Outer eccentric 20 and inner eccentric 29 cause ball pistons 27 and 28 respectively to receive oil from manifold 31, holes 35, and arcuate groove 37, and deliver it to arcuate groove 36, holes 34, and manifold 30, and to motor unit 12 in a well-known manner.

The heavy oil pressure loadings on ball pistons 27 and 28 in both pump and motor units are carried on the mostly-rolling contacts between balls 27 and 28 and their respective eccentrics 20 and 29, leaving only the tangential or torque-producing components imposed on the walls of cylinders 26 as shown in FIG. 6; consequently the friction losses are extremely low.

Having described the invention and its operation, it is obvious that the objects, as stated, have been attained in a practical manner. While a specific embodiment of the invention has been shown and described, it is understood that changes may be made in the construction and in the arrangement of the various parts without departing from the spirit or scope of the invention as expressed in the following claims.

I claim:

1. In a continuously variable hydraulic transmission, a pump unit comprising a stator, an outer eccentric in said stator, a rotor operable within said outer eccentric, a cylindrical recess in said rotor, an inner eccentric operable in said recess, radial cylinders in said rotor, an outer ball piston in each of said radial cylinders and coacting with said outer eccentric, an inner ball piston in each of said radial cylinders and coacting with said inner eccentric, the said inner and outer ball pistons in each radial cylinder diverging and converging during the intake and delivery cycles whereby pumping chambers are formed between each set of inner and outer ball pistons, and inlet and outlet means communicating with said pumping chambers, the eccentricity of one of said eccentrics being fixed, and means for adjusting the eccentricity of the other of said eccentrics to vary the combined strokes of said inner and outer ball pistons from zero to a maximum substantially equal to the ball diameter; with pumping means for supplying said radial cylinders with oil under priming pressure to keep said inner ball pistons in running contact with said inner eccentric, and a relief valve controlling said priming pressure.

2. In a continuously variable hydraulic transmission, a pump unit comprising a stator, an outer eccentric in said stator, a rotor operable within said outer eccentric, a cylindrical recess in said rotor, an inner eccentric operable in said recess, radial cylinders in said rotor, an outer ball piston in each of said radial cylinders and coacting with said outer eccentric, an inner ball piston in each of said radial cylinders and coacting with said inner eccentric, the said inner and outer ball pistons in each radial cylinder diverging and converging during the intake and delivery cycles whereby pumping chambers are formed between each set of inner and outer ball pistons, and inlet and outlet means communicating with said pumping chambers, the eccentricity of one of said eccentrics being fixed, and means for adjusting the eccentricity of the other of said eccentrics to vary the combined strokes of said inner and outer ball pistons from zero to a maximum substantially equal to the ball diameter; with balancing means providing free-floating and axial hydraulic balance of said rotor, said balancing means including two end plates, one at each end of said rotor; a high pressure arcuate groove in each of said end plates, and passage means interconnecting said high pressure arcuate grooves and connecting them to high pressure cylinders of said rotor; and a low pressure arcuate groove in each of said end plates, and passage means interconnecting said low pressure arcuate grooves and connecting them to low pressure cylinders of said rotor.

References Cited

UNITED STATES PATENTS

| 1,325,434 | 12/1919 | Carey et al. | 103—161 |
| 1,669,976 | 5/1928 | De Leeuw | 103—162 |
| 2,036,711 | 4/1936 | Martin | 103—136 |
| 2,677,329 | 5/1954 | Owen | 103—120 |
| 2,712,794 | 7/1955 | Humphreys | 103—161 |
| 2,828,697 | 4/1958 | Roosa | 103—136 |
| 3,166,016 | 1/1965 | Thoma | 103—162 |

FOREIGN PATENTS

| 752,121 | 7/1933 | France. |
| 3,827 | 2/1914 | Great Britain. |
| 120,773 | 11/1918 | Great Britain. |

DONLEY J. STOCKING, *Primary Examiner.*

MARK NEWMAN, *Examiner.*

R. M. VARGO, W. L. FREEH, *Assistant Examiners.*